United States Patent
Chung et al.

(10) Patent No.: US 10,055,378 B2
(45) Date of Patent: Aug. 21, 2018

(54) COUPLING CONNECTOR TO MANAGEMENT PORT OR SYSTEM PORT

(71) Applicant: Hewlett Packard Enterprise Development LP, Houston, TX (US)

(72) Inventors: Shih-Chiang Chung, Taipei (TW); Chun-Hung Kuo, Taipei (TW)

(73) Assignee: Hewlett Packard Enterprise Development LP, Houston, TX (US)

( * ) Notice: Subject to any disclaimer, the term of this patent is extended or adjusted under 35 U.S.C. 154(b) by 175 days.

(21) Appl. No.: 15/141,209

(22) Filed: Apr. 28, 2016

(65) Prior Publication Data

US 2017/0315954 A1    Nov. 2, 2017

(51) Int. Cl.
| | |
|---|---|
| *G06F 13/00* | (2006.01) |
| *G06F 13/42* | (2006.01) |
| *G06F 13/28* | (2006.01) |
| *G06F 11/30* | (2006.01) |
| *G06F 13/40* | (2006.01) |

(52) U.S. Cl.
CPC ...... *G06F 13/4282* (2013.01); *G06F 11/3051* (2013.01); *G06F 13/287* (2013.01); *G06F 13/4022* (2013.01)

(58) Field of Classification Search
None
See application file for complete search history.

(56) References Cited

U.S. PATENT DOCUMENTS

| | | | |
|---|---|---|---|
| 8,521,929 B2 * | 8/2013 | Dai | H04L 49/70 710/105 |
| 8,832,329 B2 | 9/2014 | Tauscher et al. | |
| 8,856,772 B2 * | 10/2014 | Fan | G06F 9/445 713/1 |
| 9,032,504 B2 * | 5/2015 | Dharmadhikari | H04L 63/0227 726/13 |
| 9,229,836 B2 | 1/2016 | Saunders et al. | |
| 2014/0156884 A1 | 6/2014 | Terlizzi et al. | |
| 2015/0019696 A1 | 1/2015 | DeCusatis et al. | |
| 2015/0074323 A1 * | 3/2015 | Chumbalkar | G06F 13/4022 710/316 |

OTHER PUBLICATIONS

Cisco, "Auto Smartports and Static Smartports Macros", Auto Smartports Configuration Guide, Release 15.0(1)SE, online <http://www.cisco.com/c/en/us/td/docs/switches/lan/auto_smartports/150_1_se/configuration/guide/asp_cg/concepts.html>, accessed Mar. 31, 2016, dated Jul. 2011, 2 pp.

* cited by examiner

*Primary Examiner* — Cheng-Yuan Tseng
(74) *Attorney, Agent, or Firm* — Michael A. Dryja

(57) ABSTRACT

A device is connected to a connector of a computing system. In response, the computing system determines whether the device is a management device. In response to determining that the device is the management device, the computing system couples the connector to a management port of a service processor of the computing system. In response to determining that the device is not the management device, the computing system couples the connector to a system port of a primary processor of the computing system.

13 Claims, 3 Drawing Sheets

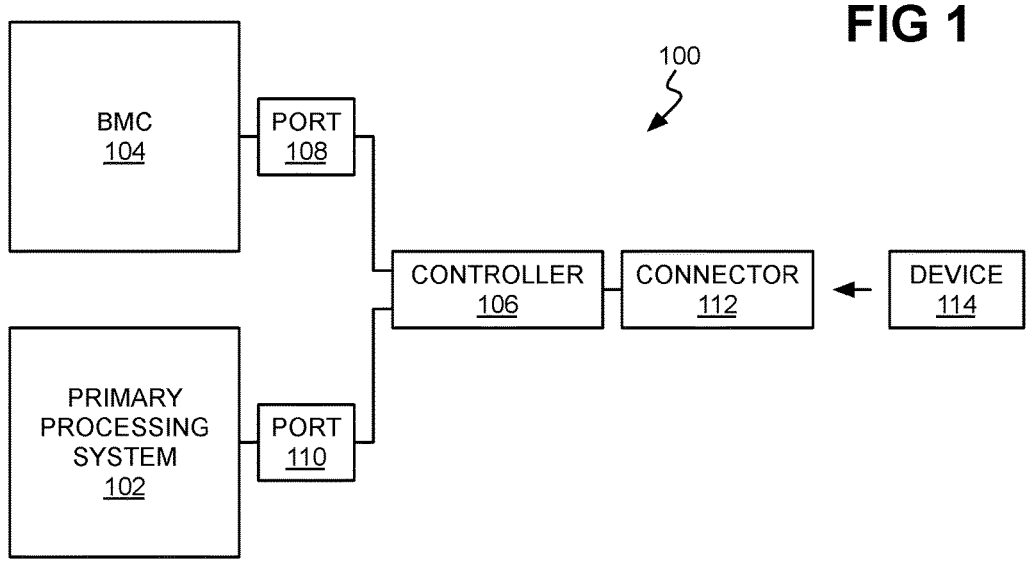
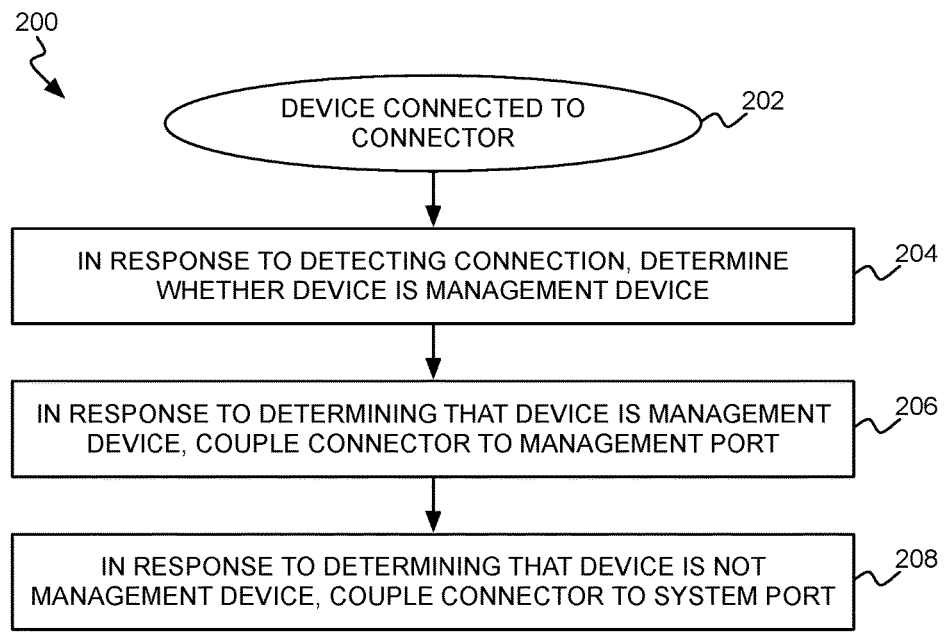

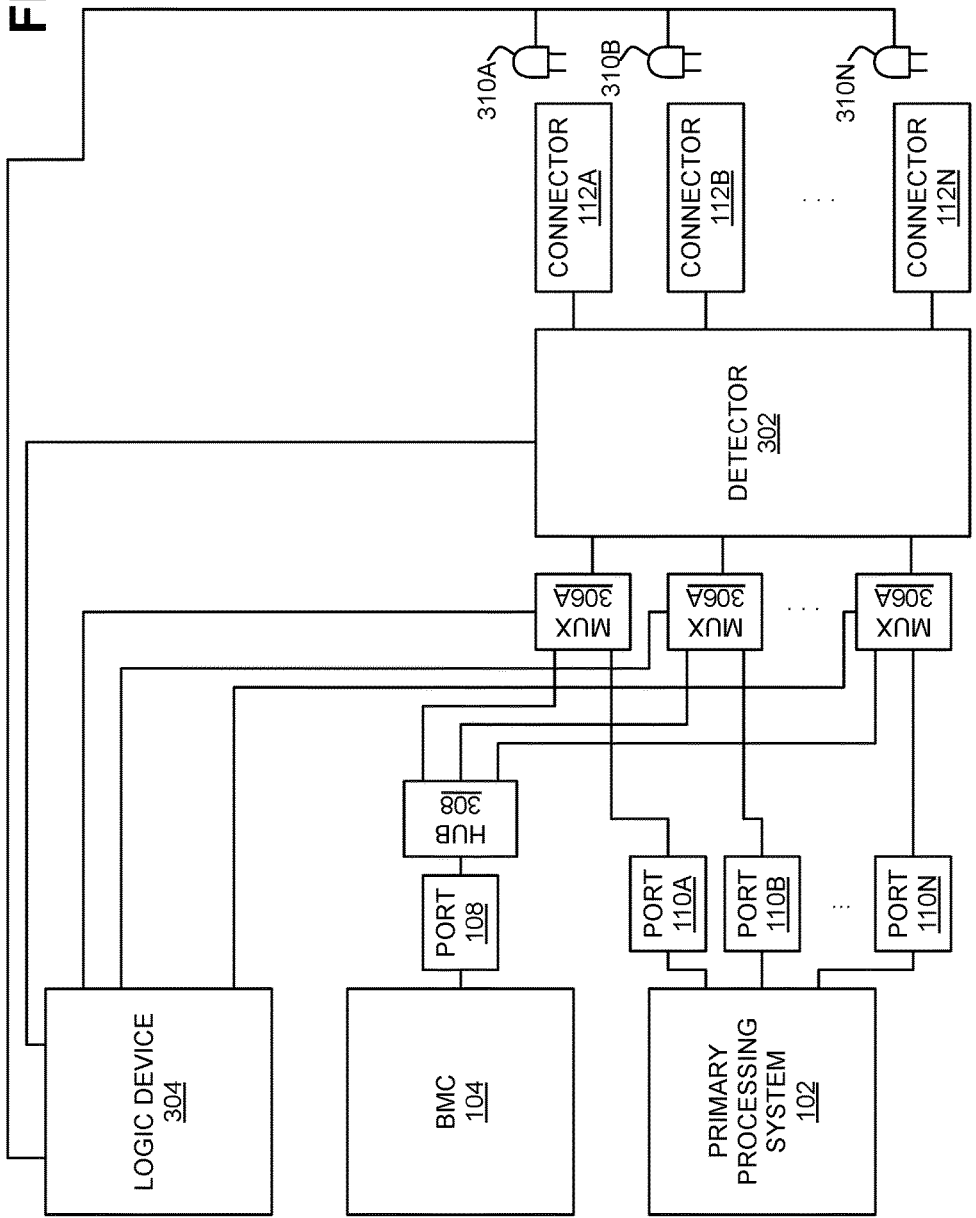

COUPLING CONNECTOR TO MANAGEMENT PORT OR SYSTEM PORT

BACKGROUND

A computing system like a server computing device commonly includes a baseboard management controller (BMC), which is also known as a service processor, in addition to a primary processing system that includes a central processing unit (CPU), or primary processor. While the primary processing system performs the workload assigned to the server, the BMC is used for out-of-band management of the server. For example, while a computing system like a server may normally be able to be managed through the primary processing system itself, if the operating system running on primary processing system fails, or if hardware of the primary processing system fails, then such in-band management may become impossible. However, out-of-band management via a BMC is still possible, because the BMC does not rely on the primary processing system. Furthermore, management via BMC may not utilize the resources of the primary processing system, so that they can be dedicated to performing the server's assigned workload.

BRIEF DESCRIPTION OF THE DRAWINGS

FIG. 1 is a diagram of an example system having a common connector for a management port of a baseboard management controller (BMC) and a system port of a primary processing system.

FIG. 2 is a flowchart of an example method to couple a connector to a management port of a service processor or to a system port of a primary processor based on whether a device connected to the connector is a management device.

FIG. 3 is a diagram of another example system that is more detailed than but consistent with that of FIG. 1 and that includes a common connector for a management port of a BMC and a system port of a primary processing system.

DETAILED DESCRIPTION

Figure 4:
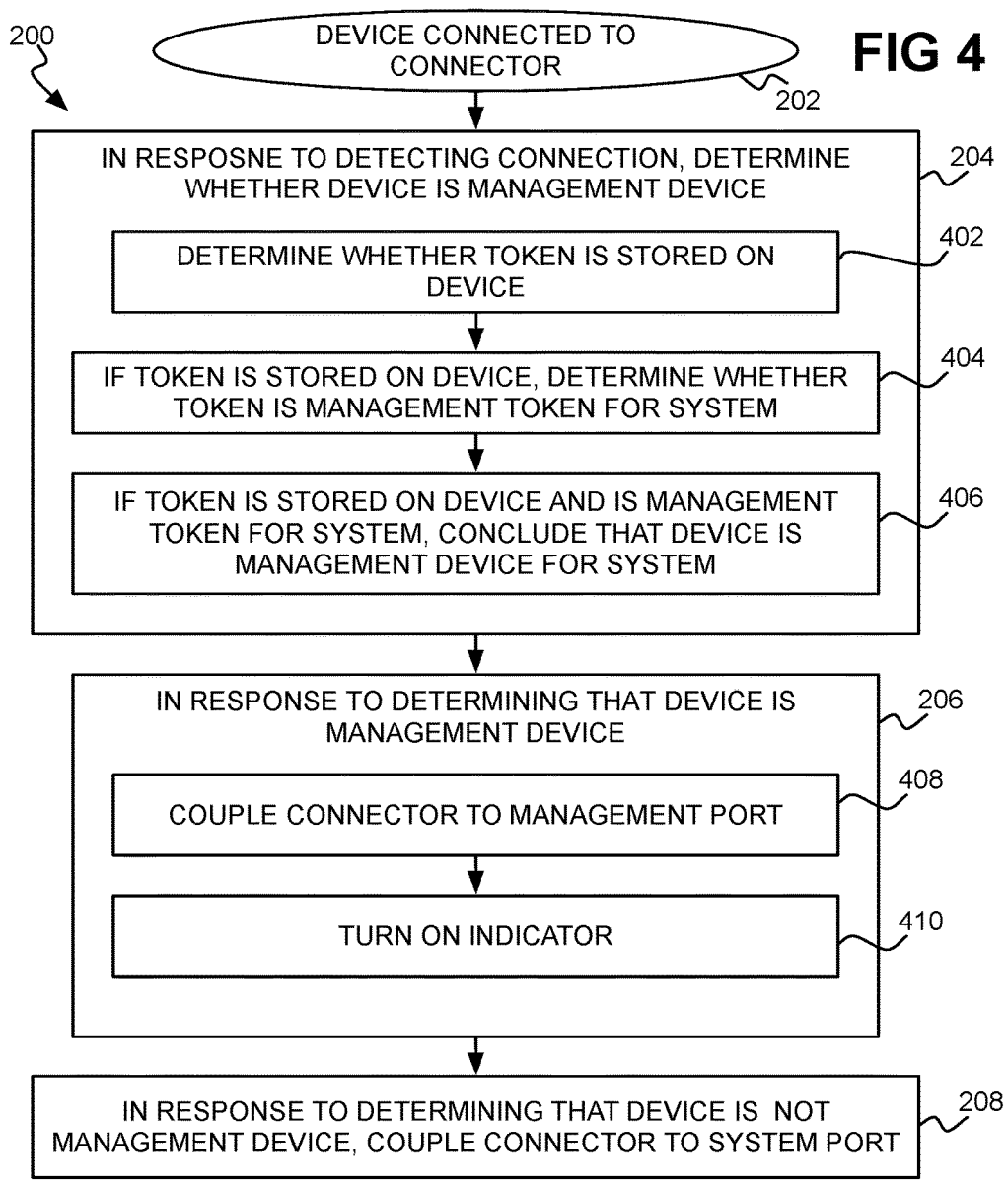
FIG. 4 is a flowchart of another example method that is more detailed than but consistent with that of FIG. 2 and that is to couple a connector to a management port of a service processor or to a system port of a primary processor based on whether a device connected to the connector is a management device.

As noted in the background, a computing system like a server computing device can include a baseboard management controller (BMC), or service processor, in addition to a primary processing system, to provide for out-of-band management of the server. The BMC may have a dedicated management port terminating in a dedicated connector to afford such out-of-band server management. For example, a dedicated universal serial bus (USB) port terminating in a dedicated USB jack may permit an administrator to insert a USB storage device onto which he or she can download log files from the BMC, or upload firmware or other updates for the system to the BMC. As another example, a dedicated Ethernet or other network port terminating in a dedicated network jack may permit the administrator to physically connect the BMC to a separate network from that to which the primary processing system is connected.

However, dedicated management ports having dedicated connectors are not without disadvantages. They require space on a server's housing apart from the real estate already used for the primary processing system's port connectors. An end user may find the dedicated connector and connect a device to it thinking that the connector is for one of the primary processing system's ports, and become confused when the primary processing system cannot recognize the device. If the dedicated connector is hidden or more inaccessible than the server's primary processing system's port connectors, an administrator may have difficulty locating or accessing the dedicated management port when necessary.

A dedicated management port having a dedicated connector can also potentially be a security risk. If the management port is left enabled at all times, if the server is not in a secure location then a malicious user is able to access the server through the management port. The BMC, for instance, may not have as much security as the primary processing system of the server does, since unlike the primary processing system the BMC is generally not very publicly exposed. If the management port is normally disabled, though, then a legitimate administrator first has to access the server in some way to enable the port before he or she can perform out-of-band management.

Techniques disclosed herein avoid these shortcomings. A computing system like a server includes a BMC, or service processor, having a management port, as well as a primary computing system (i.e., including a central processing unit (CPU), or primary processor) having a system port. Both the management port and the system port share a common connector, so that a dedicated connector is not required for the management port. When a device is connected to the common connector, the system determines whether the device is a management device. If the device is a management device, then the system couples the connector to the BMC's (dedicated) management port. Otherwise, the connector may stay coupled to the primary computing system's system port.

To determine whether the device is a management device, a management token may be established for the computing system. A device that stores the management token and which is inserted into the common connector is thus recognized as a management device, and is coupled to the management port and therefore to the BMC. A device that does not have a token, or that does not have the correct management token for the system, is by comparison coupled to the system port and therefore to the primary processing system when inserted into the common connector.

Therefore, both end users and administrators can use the same connector to communicatively couple devices to the BMC or to the primary processing system. An indicator proximate to the connector may be turned on when a management device is connected to visually provide confirmation that the connected device is coupled to the BMC and not to the primary processing system. Less space on the housing of the system is thus needed, because there does not have to be a dedicated connector for the management port. End users cannot become confused, because non-management devices plugged into the connector are coupled to the primary processing system.

Furthermore, better security is afforded even when the connector and/or the management port of the BMC is enabled all the time. A nefarious user that has physical access to the computing system and thus to the connector still may not be able to access the system via the BMC's out-of-band management capability. That is, even if such a user has a management device, if it does not store the proper management token for the computing system, then connection of this device to the common connector will couple the device to the primary processing system and not to the BMC.

FIG. 1 shows an example system 100. The system 100 may be a computing system, such as a server computing device. The system 100 includes a primary processing system 102, a BMC 104, and a controller 106. The primary processing system 102 includes a primary processor, such as a CPU, and may include more than one such processor. The primary processing system 102 includes memory, storage devices, and other components for the system 102 to perform workloads that have been assigned to the system 100.

The BMC 104, which can also be referred to as a service processor, permits out-of-band management of the primary processing system 102. The BMC 104 is also a processing system in its own right, but is typically less powerful than the primary processing system 102. Furthermore, the BMC 104 usually just performs management tasks, and does not perform the end-user workloads that have been assigned to the system 100 as a whole.

The primary processing system 102 includes a system port 110, whereas the BMC includes a management port 108. The ports 108 and 110 can be of the same type. For instance, both may be serial ports, universal serial bus (USB) ports, network ports like Ethernet ports, and so on. The nomenclature "system port" versus "management port" is used to differentiate the ports 108 and 110 from each other. The term "port" is used herein to specify a physical hardware interface that does not include a connector to which a device can be connected to the port. For example, in the case of a USB port, the interface may include a USB chipset in accordance with a USB standard to communicate with a USB device that are physically coupled to the port.

The controller 106 may be implemented in hardware, or a combination of hardware and software. The controller 106 is able to physically couple a connector 112 that is common to both the ports 108 and 110 to either port 108 or 110 at a given time. When a device 114 is connected to the connector 112, the controller 106 detects whether the device 114 is a management device for the system 100. If the device 114 is such a management device, then the controller 106 physically couples or connects the connector 112 to the management port 108 so that the device 114 is physically coupled or connected to the port 108 and thus to the BMC 104. If the device 114 is not a management device, then the controller 106 physically couples or connects the connector 112 to the system port 110 and thus to the primary processing system 102.

In one implementation, the connector 112 may default to being physically coupled to the system port 110. When the device 114 is connected to the connector 112, if the controller 106 determines that the device 114 is a management device for the system 100, the controller 106 switches the connection of the connector 112 from the system port 110 to the management port 108. If the device 114 is not a management device for the system 100, however, the controller 106 may not actively do anything, although it is said that the controller 106 effectively couples the connector 112 to the system port 110 (by default).

FIG. 2 shows an example method 200. The method is performed by the system 100, such as by the controller 106 thereof. The device 114 is connected to the connector 112 (202). The system 100 is able to detect this connection. For instance, in the case of a USB port or an Ethernet port, connection of the device 114 to a USB or an Ethernet connector 112 results in a closed electrical circuit between the device 114 and the connector 112, which the system 100 detects. In the case of a serial port, by comparison, the user may have to inform the system 100 that the device 114 has been connected to the connector 112, and receipt of this notification constitutes detection of the connection.

In response to detecting the connection, the system 100 determines whether the device 114 is a management device for the system 100 (204). A specific approach by which this determination can be achieved is described later in the detailed description. In response to determining that the device 114 is a management device for the system 100, the system 100 physically couples the connector 112 to the management port 108 of the BMC 104 (206). In response to determining that the device 114 is not a management device for the system 100, the system 100 physically couples the connector 112 to the system port 110 of the primary processing system 102 (208).

Such physical coupling of the connector 112 to the system port 110 in part 208 includes the case where the connector 112 is by default coupled to the system port 110. As such, part 208 encompasses the system 100 maintaining this default physical coupling between the connector 112 and the system port 110. In this case, the system 100 does not perform any active action to realize part 208.

FIG. 3 shows the example system 100 according to a more detailed implementation. The system 100 includes the primary processing system 102 and the BMC 104. The controller 106 of FIG. 1 includes a detector 302, a logic device 304, and one or more multiplexers 306A, 306B, . . . , 306N, which are collectively referred to as the multiplexers 306. The controller 106 can include also a hub 308, and one or more indicators 310A, 310B, . . . , 310N, which are collectively referred to as the indicators 310. The primary processing system 102 includes one or more system ports 110A, 110B, . . . , 110N, which are collectively referred to as the system ports 110. The BMC 104 includes the management port 108.

The system 100 includes one or more connectors 112A, 112B, . . . , 112N, which collectively referred to as the connectors 112. The number of connectors 112 is equal to the number of multiplexers 306, which is equal to the number of system ports 110 and to the number of indicators 310. There is a corresponding port 110, a corresponding multiplexer 306, and a corresponding indicator 310 for each connector 112. The system 100 of FIG. 3 is described with example reference to the connector 112A, the indicator 310A, the multiplexer 306A, and the system port 110A. However, this description pertains to each other set of a corresponding connector 112, indicator 310, multiplexer 306, and system port 110.

The detector 302 may be implemented as a discrete hardware device, as a hardware device integrated as part of the logic device 304, or as software code executed by the BMC 104 or the logic device 304. The detector 302 detects the connection of a device, such as the device 114 of FIG. 1, to the connector 112A. The detector 302 further determines whether the connected device is a management device or a non-management device. The logic device 304, which may be implemented as a hardware complex programmable logic device (CPLD), physically couples the connector 112A and thus the connected device to the management port 108 or the system port 110A depending on the determination of the detector 302 in this respect.

The logic device 304 can default the multiplexer 306A to physically couple the connector 112A to the system port 110A. The multiplexer 306A has an output connected to the connector 112A (such as through the detector 302), an input connected to the management port 108 (such as through or via the hub 308), and another input connected to the system port 110A. The multiplexer 306A further has a select line connected to the logic device 304. Therefore, by asserting the select line low (or high in another implementation), the logic device 304 causes the multiplexer 306A to physically couple the connector 112A to the system port 110A. By asserting the select line high (or low in the other implementation), the logic device 304 causes the multiplexer 306A to physically couple the connector 112A to the management port 108. Thus, the logic device 304 controls the select line based on whether the detector 302 determined that the device connected to the connector 112A is a management device or not.

If the detector 302 determines that the device connected to the connector 112A is a management device for the system 100, the logic device 304 also turns on the corresponding indicator 310A for the connector 112A. The indicator 310A may be a light-emitting diode (LED) located proximate to the connector 112A and visible through a housing of the system 100, for instance. The indicator 310A denotes that the device connected to the connector 112A has been recognized as a management device for the system 100, and therefore has been physically coupled to the BMC 104 via the management port 108, through the hub 308 if present, the multiplexer 306A, and the detector 302.

The hub 308 is of a type corresponding to the type of the ports 108 and 110, and can be present when there are multiple system ports 110, and thus multiple connectors 112 and multiple multiplexers 306. For instance, if the ports 108 and 110 are USB ports, the hub 308 is a USB hub. If the ports 108 and 110 are Ethernet ports, the hub 308 is an Ethernet hub, which as used herein is inclusive of an Ethernet switch, such as an unmanaged Ethernet switch. The hub 308 is connected to the management port 108 and an input of each multiplexer 306.

There are multiple connectors 112, and a management device may be able to be connected to any connector 112 with the expectation that the device will be physically coupled to the management port 108 of the BMC 104, as has been described above in relation to the connector 112A. However, there may be just one management port 108. Therefore, the hub 308 permits the management device to be able to be connected to any connector 112 and still physically connect to the management port 108. In one implementation, multiple management devices may be able to be connected at the same time to multiple connectors 112. The hub 308 permits the BMC 104 to individually access each such connected management device, and thus effectively expands one management port 108 into multiple such management ports equal in number to the number of connectors 112.

FIG. 4 shows the example method 200 according to a more detailed implementation. The method is performed by the system 100, such as by the detector 302 and the logic device 304 of FIG. 3, which are part of the controller 106 of FIG. 1. A device is connected to the connector 112A (202). In response to detecting the connection, the detector 302 determines whether the device is a management device or not (204). For example, the detector 302 may determine whether a token is stored on the device (402). A token is a security mechanism that is used to authorize the holder of the device to perform out-of-band management of the system 100 via the BMC 104. The token may be a shared secret token, or a public-key cryptographic token, for instance.

If the detector 302 determines that a token is stored on the device, the detector 302 then determines whether the token is a management token for the system 100 (404). The token may be particular to just the system 100, or to a number of systems including the system 100. For example, for a shared secret token, if the shared secret stored on the token is the same as that stored by the detector 302, then the detector 302 determines that the token is a management token for the system 100. As another example, for a public-key cryptographic token, the token may include a digital signature signed by a private key specific to the device, which the detector 302 can authenticate using the device's public key. Upon authentication, the detector 302 can then determine if the device is permitted to perform out-of-band management of the system 100. In either case, if a token is stored on the device and is a management token for the system 100, the detector 100 concludes that the device is a management device for the system 100 (406).

In response to the detector 302 determining that the device is a management device (408), the logic device 304 couples the connector 112A to the management port 108 (408). For instance, the logic device 304 can control the select line of the multiplexer 306A to select the input thereof that is connected to the management port 108 via the hub 308. The logic device 304 may also turn on the indicator 310A that is proximate to the connector 112A (410). By comparison, in response to the detector 302 determining that the device is not a management device for the system 100, the logic device 304 couples the connector 112A to the system port 110A of the primary processing system 102 (208).

Figure 5:
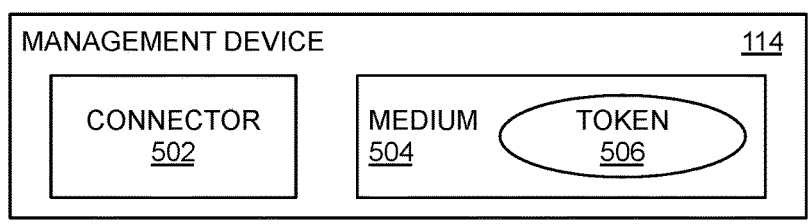
FIG. 5 is a diagram of a management device to connect to a common connector of a system to cause the system to couple the connector to a management port of a BMC of the system.

FIG. 5 shows an example management device 114. The management device 114 includes a connector 502 that can be physically connected to a connector 112 of the system 100. The management device 114 also includes a non-transitory computer-readable data storage medium 504, such as flash memory, which stores a token 506 that can be used in the method 400 to prove to the system 100 that the holder of the device 114 is permitted to perform out-of-band management of the system 100 via the BMC 104. As such, recognition of the token 506 by the system 100 upon connection of the connector 502 to one of the connectors 112 results in the device 114 being coupled to the management port 108 instead of to one of the system ports 110.

The management device 114 may be a flash drive, for instance, by which the holder of the device can then download system logs from the BMC 104, upload firmware and other files to the BMC 104 for transmission to the primary processing system 102, and so on. The management device 114 may be another type of device as well. If the token 506 stored on the management device 114 is not for the system 100, then the system 100 will not recognize the token 506 as being for the system 100, and instead will couple the device 114 to a system port 110 of the primary processing system 102.

The techniques disclosed herein thus permit the management port of a BMC or service processor and a system port of a primary processing system including a primary processor to share a common connector. Non-administrator users will not mistakenly connect devices to the management port expecting for them to be connected to the system port, because such users will likely not have devices that are recognized as management devices. Likewise, administrators will not have to locate a dedicated management port connector that may be disposed in a less readily accessible if not obscure place on a system. Furthermore, the usage of a management device having to be recognized as such by the system provides for a degree of security in permitting users to perform out-of-band system administration via the BMC.

We claim:

1. A method comprising:
in response to detecting connection of a device to a connector of a computing system, determining, by the computing system, whether the device is a management device by:
determining whether a token is stored on the device; and
in response to determining that the token is stored on the device, determining whether the token stored on the device is a management token for the computing system,
wherein the device is determined to be the management device if the token is stored on the device and if the token is the management token for the computing system;
in response to determining that the device is the management device, coupling, by the computing system, the connector to a management port of a service processor of the computing system; and
in response to determining that the device is not the management device, coupling, by the computing system, the connector to a system port of a primary processor of the computing system.

2. The method of claim 1, wherein the connector is a common connector for both the management port of the service processor and the system port of the primary processor so that a dedicated connector is not required for the management port,
and wherein the computing system couples the connector to the management port or the system port depending on whether the device connected to the connector is the management device or a non-management device.

3. The method of claim 1, wherein the connector is by default coupled to the system port of the primary processor,
and wherein coupling the connector to the system port of the primary processor comprises maintaining default coupling of the connector to the system port.

4. The method of claim 1, further comprising, in response to determining that the device is the management device:
turning on, by the computing system, a management indicator proximate to the connector to indicate that the connector is coupled to the management port of the service processor.

5. The method of claim 1, wherein coupling the connector to the management port of the service processor comprises:
controlling a select line of a multiplexer having an output connected to the connector, a first input connected to the management port of the service processor, and a second input connected to the system port of the primary processor, to select the first input.

6. A system comprising:
a primary processing system having a system port;
a baseboard management controller (BMC) having a management port;
a connector common to both the system port and the management port;
a detector to detect the connection of a device to the connector and to determine whether the device is a management device or a non-management device by:
determining whether a token is stored on the device; and
if the token is stored on the device, determining whether the token is a management token for the system; and
a controller to connect the connector to the management port upon detecting connection of the management device to the connector,
wherein the connector is connected to the system port if a non-management device is connected to the connector.

7. The system of claim 6, wherein the connector is by default connected to the system port,
and wherein the controller switches connection of the connector from the system port to the management port upon detecting the connection of the management device to the connector.

8. The system of claim 6, wherein the controller comprises:
a multiplexer having an output connected to the connector, a first input connected to the management port, a second input connected to the system port, and a select line to control whether the output is connected to the first input or to the second input.

9. The system of claim 8, wherein the controller comprises:
a detector to detect the connection of a device to the connector and to determine whether the device is the management device or the non-management device.

10. The system of claim 9, wherein the controller further comprises:
a logic device to control the select line of the multiplexer based on whether the detector has determined the device is the management device or the non-management device.

11. The system of claim 10, further comprising:
an indicator proximate to the connector to indicate that the management device has been connected to the connector,
wherein the logic device is to turn on the indicator when the detector has determined the device is the management device.

12. The system of claim 8, wherein the system port is one of a plurality of system ports of the primary processing system, the connector is one of a plurality of connectors corresponding in number to the system ports, the multiplexer is one of a plurality of multiplexers corresponding in number to the system ports, and the system further comprises:
a hub connected to the management port and to an input of each multiplexer.

13. A device comprising:
a connector to connect to a corresponding connector of a computing system having a service processor with a management port and a primary processor with a system port;
a non-transitory computer-readable data storage medium; and
a management token stored on the non-transitory computer-readable data storage medium, the management token for the computing system,
wherein recognition, by the computing system, the management token is stored on the device upon connection of the connector of the device to the corresponding connector of the computing system results in the device being coupled to the management port as opposed to the system port;
wherein the device is determined to be the management device if the token is stored on the device and if the token is the management token for the computing system.

* * * * *